Aug. 19, 1924.  
J. H. DORAN  
1,505,590  
SHAFT PACKING FOR ELASTIC FLUID TURBINES AND THE LIKE  
Original Filed Aug. 4, 1920
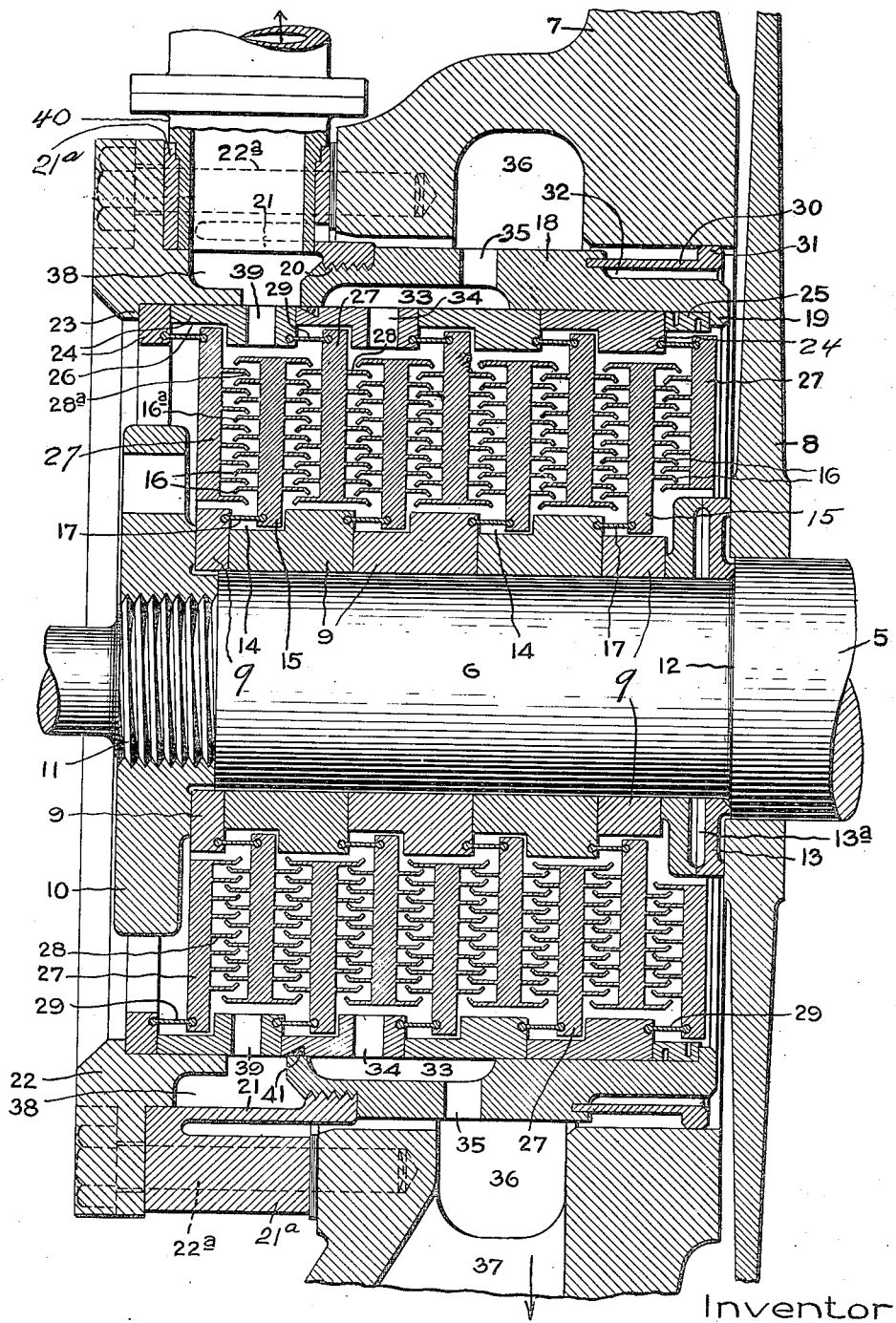
Inventor:  
John H. Doran,  
by Albert G. Davis  
His Attorney.

Patented Aug. 19, 1924.

1,505,590

UNITED STATES PATENT OFFICE.

JOHN H. DORAN, OF SCHENECTADY, NEW YORK, ASSIGNOR TO GENERAL ELECTRIC COMPANY, A CORPORATION OF NEW YORK.

SHAFT PACKING FOR ELASTIC-FLUID TURBINES AND THE LIKE.

Application filed August 4, 1920, Serial No. 401,185. Renewed July 19, 1923.

*To all whom it may concern:*

Be it known that I, JOHN H. DORAN, a citizen of the United States, residing at Schenectady, in the county of Schenectady, State of New York, have invented certain new and useful Improvements in Shaft Packings for Elastic-Fluid Turbines and the like, of which the following is a specification.

The present invention relates to packings such as are used to prevent the leakage of elastic fluid between two concentric relatively rotating elements, and particularly to packings of the labyrinth type. One application of my invention is in connection with elastic-fluid turbines and in this specification I specifically illustrate and describe my invention applied to this use. It will be understood, however, that the invention is not necessarily limited to this particular application.

With the advent of turbines utilizing elastic fluid of higher pressures and superheats the providing of suitable packings particularly for the high pressure ends of the machines has become increasingly difficult. The higher pressure requires larger packings in order to keep down the leakage which means larger packing parts, and the higher superheats means that the packing parts are subjected to higher temperatures and greater variation in temperature thereby tending to distort the parts due to expansion and contraction. If the parts distort, the packing surfaces get out of alignment, so they open up at some points to permit undue leakage and rub at other points wearing away the packing edges. This results in destroying the efficiency of the packing. Also, in larger turbines such as are now coming into use the shafts required are of greater diameter which makes a greater packing area and requires larger packing parts.

It is accordingly necessary if a packing is to be efficient in service that it maintain its alignment, and the object of my invention is to provide an improved structure and arrangement in a packing of the labyrinth type which will maintain its alignment even under the most severe conditions.

For a consideration of what I believe to be novel and my invention, attention is directed to the accompanying description and the claims appended thereto.

In the drawing, the figure is a sectional view of a packing embodying my invention.

Referring to the drawing, 5 indicates a rotating shaft, such as a turbine shaft, provided with a reduced end 6 which carries the rotating part of the packing, and 7 indicates a casing or housing which is supported on the end of the turbine casing and carries the stationary part of the packing. The first stage wheel of the turbine is indicated at 8.

The rotating part of the packing comprises a number of rings 9 fixed on shaft end 6 as by being shrunk and keyed thereon, and held between a nut 10 threaded on shaft end part 11 and shoulder 12 at the junction of shaft parts 5 and 6. Between the innermost ring 9 and shoulder 12 is located an axially yieldable member 13 in the form of a ring U-shaped in cross-section, the open end of the U facing toward the shaft. It may be made from a single piece having a groove 13ª cut in it or it may be made from two pieces as shown. Yieldable member 13 will permit slight axial movement of rings 9 along shaft end 6 due to unequal expansion and contraction while at the same time maintaining the rings tight one against the other. Rings 9 are so shaped and arranged as to provide grooves 14 and yieldingly fastened to a side wall of each groove is a rotating packing element comprising an annular plate 15 from the two sides of which project thin annular packing teeth 16. Annular plates 15 are preferably fastened to side walls of grooves 14 by means of cylindrical expansion rings 17, each of which has one edge fastened to a plate 15 and the other edge fastened to a wall of a groove 14.

The stationary part of the packing comprises a shell 18 provided at its inner end with an inwardly projecting annular shoulder 19. The outer end of shell 18 is threaded on its outer surface as indicated at 20 and engaging therewith is one end of a yielding cylindrical ring 21, the other end being connected to a ring 21ª, it being shown as being formed integral therewith in the present instance, and also concentric therewith so as to economize in axial length. Ring 21ª is located between the end of casing 7 and an end ring 22, the two rings being fastened in position by bolts 22ª. The inner surface of ring 22 is flush with the inner surface of shell 18 and is provided with an inwardly projecting annular shoulder 23 between which and shoulder 19 are held rings 24, there being an axially yieldable bushing 25, between the innermost ring 24 and shoulder 19 which performs the same function as does yielding member 13. Bushing 25 is shown as comprising a ring having annular grooves cut in it to make it axially yieldable. Rings 24 are so shaped and arranged as to provide annular internal grooves 26. To a side surface of each groove 26 is fastened a stationary packing element comprising a flat annular plate 27 carrying annular packing teeth 28 which interleave with packing teeth 16 on plates 15. The two end plates 27 have teeth 28 on only one side while the others have teeth on both sides. The flat plates 27 are fastened in grooves 26 by expansion rings 29 of the same character as rings 17.

Packing teeth 16 and 28 are provided at their free ends with thin angularly extending edges 16$^a$ and 28$^a$ which extend toward and lie in packing relation to the surfaces of the adjacent teeth. By this arrangement axial movement of the packing parts relatively to each other does not affect the packing clearances.

Shell 18 is positioned in spaced relation to the inner surface of housing 7. Its outer end is yieldingly held in such position by ring 21 and its inner end is yieldingly held in such position by a cylindrical ring 30, one edge of which is fastened to shell 18, the other edge having an outturned rim 31 which contacts with housing 7. Shell 18 is provided with a recess 32 in which ring 30 is located so that the ring and shell are concentric. By this arrangement I may utilize a ring of sufficient length to give the desired flexibility without increasing the axial length of the packing. The contacting of rim 31 with housing 7 forms a tight joint or packing which prevents leakage of elastic fluid into the space between shell 18 and housing 7.

In the inner surface of shell 18 is a recess which forms with the outer surfaces of certain rings 24 an annular chamber 33 connected by passages 34 in a ring 24 to the interior of the packing. Chamber 33 is also connected by a suitable number of holes 35 to an annular chamber 36 in housing 7. Leading from chamber 36 is a passage 37 which conveys leakage elastic fluid to a point of intermediate pressure in the turbine, this being an arrangement known in the art.

Between the inner edge of ring 22 and the end of shell 18 is an annular chamber 38 connected to the outermost cell of the packing by holes 39. Leading from chamber 38 is a discharge conduit 40 which may convey the low pressure leakage elastic fluid to atmospheric or other suitable point. It will be noted that the end of conduit 40 extends through yielding ring 21 so the two chambers 33 and 38 are entirely separated from each other. The end of conduit 40 makes a sliding fit with yielding ring 21 so as not to interfere with radial expansion or movement of said ring. At 41 is a packing to prevent leakage between the end of shell 18 and the adjacent ring 24 against which it rests.

With the above described arrangement, it will be seen that shell 18 which carries the stationary packing elements is yieldingly mounted in spaced relation to housing 7 so that the stationary part of the packing may expand and contract radially as a whole without distortion; likewise each packing element of both the rotating part and the stationary part of the packing is yieldingly mounted on the member which carries it so that it may expand and contract radially without distortion. When a change in temperature occurs in the packing such as is met with in starting up or with change in load for example, the packing elements comprising plates 15 and 27 heat up or cool much more quickly than do the parts which carry them. At such times the yielding connections permit the packing elements to expand or contract radially and since adjacent plates will expand or contract at substantially the same rate the clearances will not be impaired.

The axially inner portion of the packing is of course subjected to much higher temperatures than the outer portion and as a result shell 18 is always unevenly heated; the inner end being hotter. Also the greatest temperature changes occur at the inner end of the packing, the outer end remaining fairly evenly heated at all times. By having shell 18 yieldingly supported in spaced relation to housing 7 it can expand and contract when unevenly heated without distortion. At the same time it is firmly supported in concentric relation to the shaft by the yielding rings 21 and 30.

In the present instance I have shown the outermost stationary rings 24 as being carried by end ring 22 and this is satisfactory since as already stated the outer end of the packing is subjected to but small variations in temperature as compared to the inner end, and the temperature is comparatively low. By this arrangement I utilize all the axial length of the packing to the greatest advantage, getting in the most packing elements possible for the axial length utilized. Or, viewed from another aspect, by this arrangement I can get in the necessary number of packing elements in the least possible axial length.

As is obvious from a consideration of the structure, the packing can be readily assembled and dismantled. Should one of the packing elements be damaged, the packing can be readily taken down by removing nut 10 and ring 22, a new packing element substituted and the packing assembled again.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a packing, a casing, a rotating member, an axially-extending cylindrical shell which surrounds the rotating member and stands in radially spaced relation to the casing and the member, radially-yielding means connecting the shell to the casing whereby the shell can expand and contract in a radial direction, non-rotating packing means located in the space between the rotating member and the shell, radially-yielding means connecting such packing means to the shell, rotating packing means in packing relation to said non-rotating packing means, and radially-yielding means connecting said rotating packing means to said shaft.

2. In a packing, a shaft, rings fixed on said shaft, packing elements comprising plates having annular projecting teeth thereon, yielding means connecting said elements to said rings, a stationary member, and packing elements yieldingly connected to said stationary member, said last named packing elements comprising plates having annular projecting teeth thereon which are in packing relation to the first-named teeth.

3. In a packing, a shaft, rings fixed on said shaft, packing elements comprising plates having annular projecting teeth thereon, yielding means connecting said elements to said rings, a stationary member, a shell yieldingly connected thereto, and packing elements yieldingly connected to said shell, said last-named packing elements comprising plates having annular projecting teeth thereon which are in packing relation to the first-named teeth.

4. In a packing, a shaft, rings fixed on said shaft, packing elements comprising plates having annular projecting teeth thereon, yielding means connecting said elements to said rings, a stationary member, a shell, cylindrical rings concentric with the shell which yieldingly connects the shell to the stationary member, and packing elements yieldingly connected to said shell, said last-named packing elements comprising plates having annular projecting teeth thereon which are in packing relation to the first-named teeth.

5. In a packing, a shaft, rings fixed on said shaft, rotating packing elements comprising plates having annular projecting teeth thereon, cylindrical ring means connecting said elements to said rings, a stationary member, a shell, cylindrical ring means concentric with the shell which yieldingly connects the shell to the stationary member, stationary packing elements, and cylindrical ring means connecting them to said shell, said last-named packing elements comprising plates having annular projecting teeth thereon which are in packing relation to the first-named teeth.

6. In a packing, a shaft, rings fixed on said shaft and held yieldingly against axial movement, a shell, rings fixed in said shell and held yieldingly against axial movement, cooperating packing elements yieldingly connected to said rings, a casing surrounding said shell in spaced relation thereto, and yielding means connecting said shell to said casing.

In witness whereof, I have hereunto set my hand this 3rd day of August 1920.

JOHN H. DORAN.